Patented July 8, 1924.

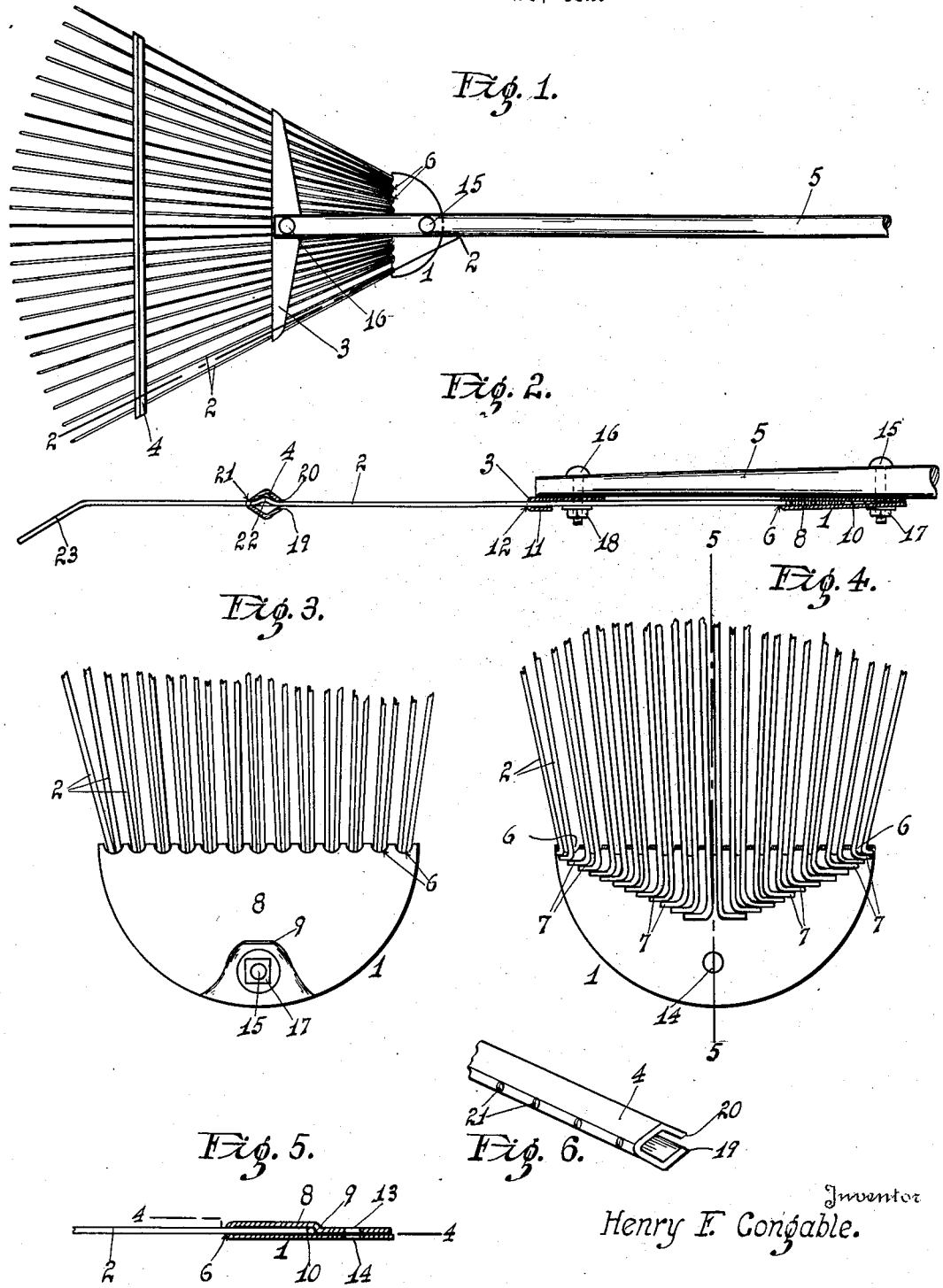

1,500,441

UNITED STATES PATENT OFFICE.

HENRY F. CONGABLE, OF OAKLAND, CALIFORNIA, ASSIGNOR TO ROBINSON HARDWARE COMPANY, OF OAKLAND, CALIFORNIA, A CORPORATION OF CALIFORNIA.

GARDEN BROOM.

Application filed December 24, 1921. Serial No. 524,748.

*To all whom it may concern:*

Be it known that I, HENRY F. CONGABLE, a citizen of the United States, residing at Oakland, in the county of Alameda and State of California, have invented certain new and useful Improvements in Garden Brooms, of which the following is a specification.

My invention is a garden broom constructed with removable steel tines which may be readily replaced if broken.

Referring to the annexed drawing in which my invention is illustrated and which forms a part of this specification:

Figure 1 is a side view of my broom.

Figure 2 is a longitudinal section of my broom taken on line 2—2 of Figure 1.

Figure 3 is a fragmentary side view of my broom with the handle removed.

Figure 4 is a fragmentary sectional view of my broom taken on line 4—4 of Figure 5.

Figure 5 is a fragmentary longitudinal section of my broom taken on line 5—5 of Figure 4.

Figure 6 is a perspective view of the tine spacer.

My broom includes a head 1, steel tines 2, spacers 3 and 4, and a handle 5. The head 1 comprises a circular plate bent diametrically upon itself. The diametrical bend of said plate is provided with a plurality of apertures 6 spaced closely together transversely of the plate, through which apertures the tines 2 extend between the two members of the plate. The inner ends 7 of the tines 2 are bent at right angles. Two tines are placed in each aperture 6. The angular ends 7 of the tines 2 in the center aperture 6 of the plate 1, at the right and left of said aperture extend to the right and left respectively. The ends 7 of the tines in the holes 6 at the right of the center hole extend to the right. The angular ends of the tines to the right of the center of the head 1 rest successively one upon the other except the end of the tine at the extreme right of the plate which rests against the inside of the diametrical bend in plate as shown in Figure 4. The angular ends of the tines to the left of the center of the head 1 rest successively one upon the other except the end of the tine at the extreme left of the plate which rests against the inside of the diametrical bend in the plate as shown in Figure 4. One member 8 of the head has an inward offset 9 which rests against the other member 10 of the plate and its innermost edge engages the angular ends 7 of the central tines 2 whereby all of the tines are held firmly in the head against longitudinal movement.

The spacer 3 comprises a metal plate bent to form a flange 11 and the bend in the plate has a plurality of apertures 12 through which the tines 2 extend, said apertures being spaced further apart than the apertures 6 whereby said tines are caused to diverge from the head 1. Apertures 13 and 14 are provided in the members 8 and 10 near the periphery and midway between the sides thereof through which aperture extends a bolt 15 which extends through the handle 5. A bolt 16 extends through the handle 5 and through the spacer 3. Nuts 17 and 18 screw on the ends of the bolts 15 and 16 against the head 1 and spacer 3 respectively whereby the handle is secured on the broom. The spacer 4 comprises a metal plate bent substantially square in cross section with its edges 19 and 20 spaced slightly apart at one corner of the spacer through which space extend the tines 2 which also extend through apertures 21 in the corner of the spacer opposite said edges, said apertures being spaced further apart than the apertures 12. The spacer 4 spaces the tines firmly apart near their outer ends. The tines 2 are offset slightly at 22 within the spacer 4 to prevent the spacer from sliding out of position on the tines. The outer ends of the tines may be bent into prongs 23.

Having described my invention, I claim:

1. In a garden broom a head comprising a plate bent upon itself and provided with a plurality of apertures adjacent to the bend thereof, tines extending through the apertures the ends of the tines between the members of the plate being bent at an angle, the bent ends of the tines engaging each other successively and lying in substantially the same plane and means whereby the tines are maintained in engagement with each other.

2. In a garden broom a head comprising a plate bent upon itself and provided with a plurality of apertures adjacent to the bend thereof, tines extending through the apertures, the ends of the tines between the members of the plate being bent at an angle, the bent ends of the tines engaging each other successively and lying in substantially the same plane and means whereby the tines are maintained in engagement with each other, comprising an offset portion in one member of the plate.

3. In a garden broom a head comprising a plate bent upon itself and provided with a plurality of apertures adjacent to the bend thereof, tines extending through the apertures, the ends of the tines between the members of the plate being bent at an angle, the bent ends of the tines engaging each other successively and lying in substantially the same plane and means whereby the tines are maintained in engagement with each other, comprising an offset portion in one member of the plate cooperating with the inside of the bend in said plate to clamp the bent ends of the tines together.

4. A garden broom including a head formed of a metal plate bent upon itself and provided with a plurality of spaced apertures in the bend thereof, tines extending through said apertures between the members of said plate, the inner ends of said tines being bent at right angles, the bent ends of the tines at the right of the center of the plate engaging each other successively except the bent end of the extreme right tine which engages the inner side of the bent portion of the plate, the bent ends of the tines at the left of the center of the plate engaging each other successively, except the bent end of the extreme left tine which engages the inner side of the bend in said plate, an offset in one member of said head engaging the bent ends of the two innermost tines to hold them against longitudinal displacement, a handle secured near its end to said head, and a spacer secured to the end of said handle for spacing the tines in diverging relation from said head.

5. In a garden broom having a head, elongated tines secured to the head, and a handle secured to the head; a member for holding said tines in spaced relation comprising a strip of metal bent substantially square in cross section with its edges spaced slightly apart and arranged to grip the tines by frictional contact, and said member having apertures through which the tines extend.

6. In a garden implement, having a handle, a head member secured to said handle, and elongated tines secured to said head member, a spacing member for said tines formed of a channel member, the edges of this last named member being adapted to grip said tines by frictional contact in order to hold said last named member in position on said tines.

7. In a garden broom having a handle, a head member secured to said handle, and elongated tines extending into said head, a spacer bar in the form of a channelled member having inwardly bent edges and having apertures through which the tines extend, the tines also extending between the inwardly bent edges of said member, a bent up portion in each of said tines located between the inwardly bent edges and the bottom of said additional member.

8. In a garden implement, having a handle, a head member secured to said handle, and a plurality of elongated tines secured within said head member and a spacer member secured across said tines beyond the end of said handle, said spacer member being formed as a channeled metal bar having inwardly bent edges, the tines passing through the bottom of the channel in said channeled member and frictionally gripped between the inwardly bent edges of said member, and a bent up portion in each of said tines located between the inwardly bent edges and the bottom of the channel of the said spacer member.

In testimony whereof I affix my signature.

HENRY F. CONGABLE.